(No Model.)

O. H. JEWELL.
APPARATUS FOR FILTERING SIRUPS.

No. 445,371. Patented Jan. 27, 1891.

Witnesses:
Otto Luebkert
Owen V. Stookey

Inventor:
Omar H. Jewell
By Winkle Rotz
Attorney

UNITED STATES PATENT OFFICE.

OMAR H. JEWELL, OF CHICAGO, ILLINOIS.

APPARATUS FOR FILTERING SIRUPS.

SPECIFICATION forming part of Letters Patent No. 445,371, dated January 27, 1891.

Application filed September 8, 1890. Serial No. 364,384. (No model.)

*To all whom it may concern:*

Be it known that I, OMAR H. JEWELL, a citizen of the United States of America, residing at Chicago, in the county of Cook and State of Illinois, have invented certain new and useful Improvements in Apparatus for Filtering Sirups, of which the following is a specification, reference being had therein to the accompanying drawings.

This my invention relates to devices principally intended for filtering sirups, but that may also be used for filtering water.

The filtering of sirup heretofore was accomplished by automatically feeding the sirup into bags made of canvas or other fibrous fabric, through which the pure sirup had to escape, leaving all the impurities in such bags, which at intervals had to be turned inside out to be washed for removing all such impurities, and it is the object of this my invention to provide a device by which the filtering medium is an endless apron slowly moving, and while used for filtering at one location to be washed and cleaned at another location, whereby the operation is continuous; and with these objects in view my invention consists of the novel devices and combinations of devices hereinafter described, and specifically claimed.

Figure 1:
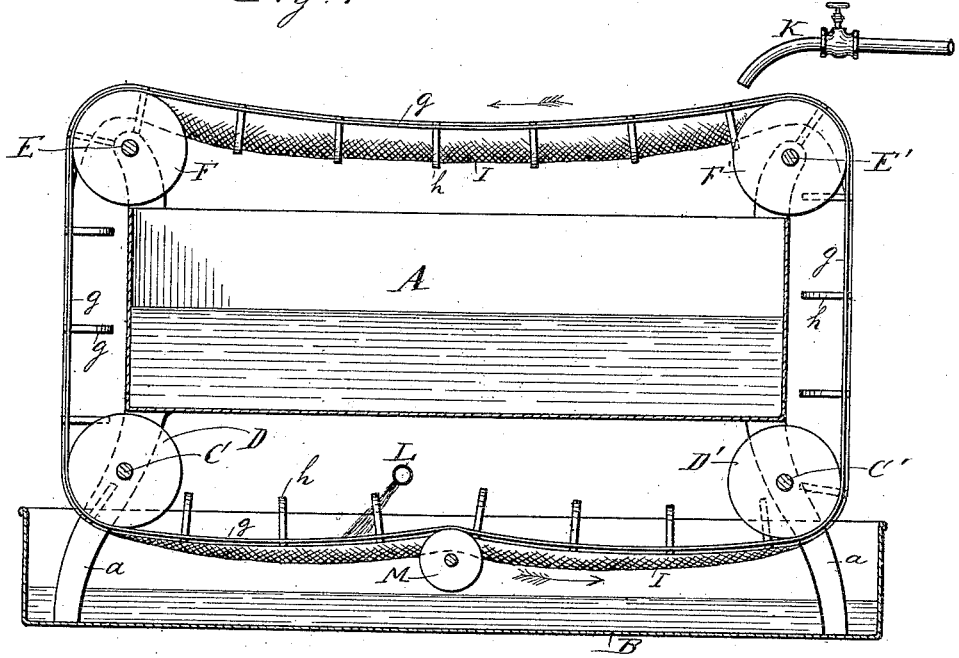
Figure 2:
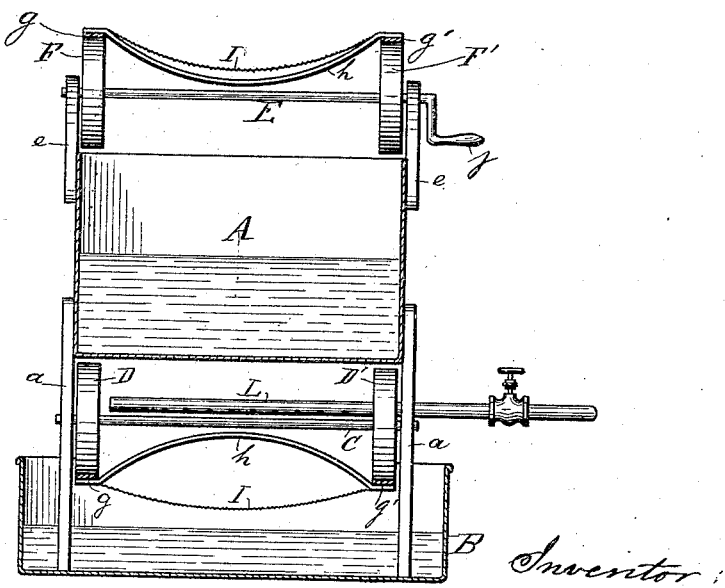

In the accompanying drawings, Figure 1 represents a sectional side elevation, and Fig. 2 a transverse vertical section, of my filtering apparatus.

Corresponding letters of reference in the several figures of the drawings designate like parts.

A denotes the tank or receptacle in which the filtered sirup is to collect and from which it is to be emptied through a suitable faucet, pipe, or trough. (Not shown in the drawings.) This tank A is provided with legs $a$, on which it rests in another more shallow tank B. These legs $a$ may be provided with suitable bearings for two shafts C C′, each having mounted at proper distance apart two pulleys D and D′. To its upper edge at both side ends the tank A has secured upwardly-projecting arms $e$, providing the bearings for two shafts E E′, each having mounted at proper distance apart two pulleys F and F′. All of these pulleys D D′ F F′ at each side of the tank are in proper line for an endless belt $g$ $g'$ to travel thereon around tank A, and both belts $g$ $g'$ are connected by bow-shaped cross-bars $h$, that will hold them a proper distance apart or parallel with each other, and upon the belts $g$ $g'$ are secured the side edges of an endless apron I, which is to be made of canvas, felt, or any other suitable fabric of fibrous or porous material. This apron I is so fastened between the belts $g$ and $g'$ that it can sag and form a concavity while being on a horizontal position. One of the shafts E has a crank $j$ to one of its ends for rotating said shaft and the pulleys mounted thereon, whereby the apron I will be moved in the direction of the arrows and motion will be imparted to all the pulleys carrying such apron; but instead of a crank $j$ a pulley or gear-wheels may be mounted upon the overhanging end of the shaft E for driving the same, the motion to be imparted to the endless apron I having to be very slow.

Into the cavity of the apron I, above the tank A, is fed from a pipe K the sirup previously heated to make it highly fluid, which sirup will filter through the apron I into the tank A, leaving on top of such apron all impurities contained therein. These impurities are blown off and washed out of the apron I as it reaches the position below tank A by jets of steam ejected from the perforations of a pipe L, extending transversely under the tank. Below such tank A the belts $g$ $g'$ may be supported on two or more carrier-wheels M. The impurities thus removed from the apron I will be washed into tank B, whence, as accumulating, they may be discharged from such tank. It will thus be readily seen that by this device the filtering and the cleaning operation of the endless apron will be automatically and uninterruptedly continuous.

For filtering water the operation will be exactly the same, only that jets of water instead of steam will be ejected upon the lower part of the apron as it travels from under the tank.

What I claim is—

In combination with a receptacle for the filtered material, an endless apron composed of flexible material suitable for filtering, cured between two endless belts connected by cross-bars, wheels arranged above and below the receptacle for carrying the endless belt, a pipe for feeding the liquid to be filtered above the endless apron, and a perforated pipe below such receptacle for ejecting jets of steam or water upon the lower portion of the apron, substantially as set forth.

In testimony whereof I affix my signature in presence of two witnesses.

OMAR H. JEWELL.

Witnesses:
    WILLIAM H. LOTZ,
    OTTO LUEBKERT.